US008631738B2

(12) United States Patent
Tippmann et al.

(10) Patent No.: US 8,631,738 B2

(45) **Date of Patent: *Jan. 21, 2014**

(54) BOILER ASSEMBLY FOR A GRIDDLE

(75) Inventors: Vincent P. Tippmann, Fort Wayne, IN (US); Joseph Tippmann, Fort Wayne, IN (US)

(73) Assignee: American Griddle Corporation, Fort Wayne, IN (US)

( * ) Notice: Subject to any disclaimer, the term of this patent is extended or adjusted under 35 U.S.C. 154(b) by 580 days.

This patent is subject to a terminal disclaimer.

(21) Appl. No.: 12/630,401

(22) Filed: Dec. 3, 2009

(65) Prior Publication Data

US 2011/0132203 A1 Jun. 9, 2011

Related U.S. Application Data

(63) Continuation of application No. 11/290,568, filed on Dec. 1, 2005, now Pat. No. 7,677,160.

(60) Provisional application No. 60/632,602, filed on Dec. 3, 2004.

(51) Int. Cl.
*A47J 37/10* (2006.01)

(52) U.S. Cl.
USPC .............................................. 99/422; 99/330

(58) Field of Classification Search
USPC ........... 99/330, 331, 339, 340, 422, 425, 447, 99/450; 126/348, 377.1, 378.1, 392.1
See application file for complete search history.

(56) References Cited

U.S. PATENT DOCUMENTS

| | | | | |
|---|---|---|---|---|
| 220,828 A * | 10/1879 | Danis | 126/348 |
| 3,603,767 A | 9/1971 | Scicchitano | |
| 3,815,575 A * | 6/1974 | Danis | 126/378.1 |
| 3,853,112 A | 12/1974 | Lazaridis et al. | |
| 4,245,147 A * | 1/1981 | Cummings et al. | 219/449.1 |
| 4,660,542 A * | 4/1987 | Scherer | 126/378.1 |
| 4,955,361 A | 9/1990 | Sotani et al. | |
| 6,145,431 A * | 11/2000 | Tippmann et al. | 99/330 |
| 6,539,839 B1 | 4/2003 | Tippmann | |

FOREIGN PATENT DOCUMENTS

| | | |
|---|---|---|
| JP | 54-150267 A | 11/1979 |
| JP | 58179731 A | 10/1983 |
| JP | 2-110251 A | 4/1990 |

* cited by examiner

*Primary Examiner* — Gene Kim
*Assistant Examiner* — John E Simms, Jr.
(74) *Attorney, Agent, or Firm* — Birch, Stewart, Kolasch & Birch, LLP

(57) ABSTRACT

A griddle for cooking a food product includes an upper surface, a lower surface, a first side, a second side, a front side and a rear side. A serpentine passageway is formed on the lower surface. A collector tank is juxtaposed and secured directly in touching contact with the lower surface adjacent to the first side of the griddle and is in communication with the serpentine passageway. A boiler is juxtaposed and secured directly in touching contact with the lower surface adjacent to the second side of the griddle and is in communication with the serpentine passageway. Heat applied directly to at least one of the collector tank and the boiler for heating a fluid disposed therein and supplying the heated fluid to the serpentine passageway for providing heat for cooking a food product disposed on the upper surface of the griddle.

17 Claims, 5 Drawing Sheets

12 10 36 24 20 16 30 42 14 36 18 44 22 34B 34A 32 38

BOILER ASSEMBLY FOR A GRIDDLE

CROSS-REFERENCE TO RELATED APPLICATIONS

The present application claims priority under 35 USC 119 (e) to U.S. Provisional Patent Application No. 60/632,602 filed on Dec. 3, 2004 and under 35 USC 120 to U.S. patent application Ser. No. 11/290,568 filed on Dec. 1, 2005, now U.S. Pat. No. 7,677,160 issued on Mar. 16, 2012 the entire contents of which are hereby incorporated by reference.

BACKGROUND OF THE INVENTION

1. Field of the Invention

The present invention relates to a griddle for cooking a food product wherein the boiler for supplying steam to a serpentine path formed under the griddle and the condensate collector tank are secured directly to the underside of the griddle.

2. Description of Background Art

Hithertofore, griddles have been available wherein a separate boiler is provided for supplying steam to a continuous path disposed within the griddle. This construction requires a relative large housing for the griddle and boiler. The separate boiler has to be positioned within a cabinet used for supporting the griddle. Thus, a certain amount of space in a kitchen area is required for the combination of the cabinet and the griddle. With the requirement of a separate boiler, it is difficult to provide a cook-top griddle that can be positioned on top of an existing cabinet, or countertop. See, the Tippmann et al patent, U.S. Pat. No. 6,145,431 which is hereby incorporated by reference.

SUMMARY AND OBJECTS OF THE INVENTION

The present invention provides a griddle wherein the boiler for supplying steam to a continuous path formed within the griddle is secured directly to an underside of the griddle. In this way, steam is supplied directly to the boiler disposed directly under the griddle for heating a fluid that is provided to flow through the continuous path within the griddle. Thus, the griddle of the present invention may be used as a cook-top on an existing cabinet or countertop in a kitchen. In addition, the griddle of the present invention may be used in combination with a cabinet. For storing food and supplies, or mounted the griddle on the cabinet.

These and other objects of the present invention are achieved by providing a cooking surface having an upper surface, a lower surface, a first side, a second side, a front side and a rear side. A serpentine passageway is formed on the lower surface. A single collector tank is juxtaposed and secured directly in touching contact with the lower surface adjacent to the first side of the griddle. The single collector tank is in communication with said serpentine passageway formed on the lower surface. A single boiler is juxtaposed and secured directly in touching contact with the lower surface adjacent to the second side of said griddle. The single boiler is in communication with the serpentine passageway formed on the lower surface. Heat may be applied directly to the single boiler for generating steam disposed therein and supplying the steam to the serpentine passageway for providing heat for cooking a food product disposed on the cooking surface on the area directly above the boiler, the serpentine passageway and the collector tank.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
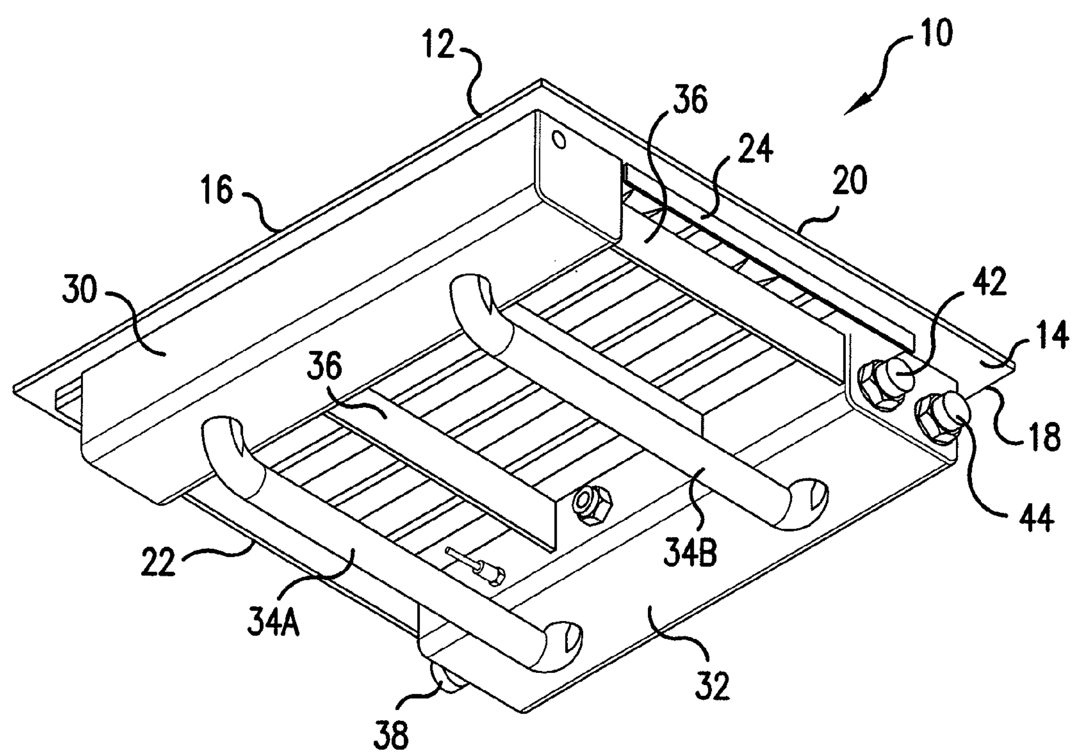
FIG. 1 is a perspective view of a lower surface of a griddle illustrating the boiler and the collector tank being attached directly to the lower surface.
Figure 2:
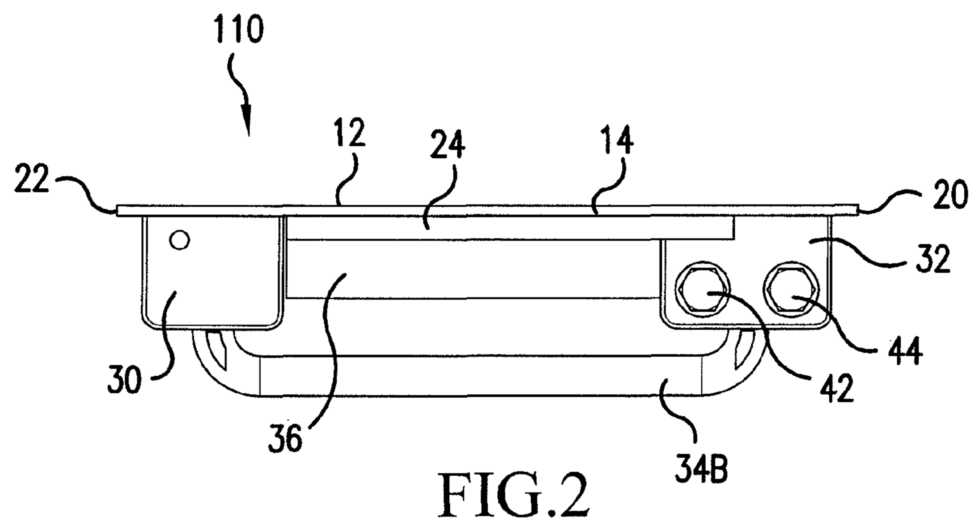
FIG. 2 is a right side elevational view of the griddle illustrated in FIG. 1.
Figure 3:
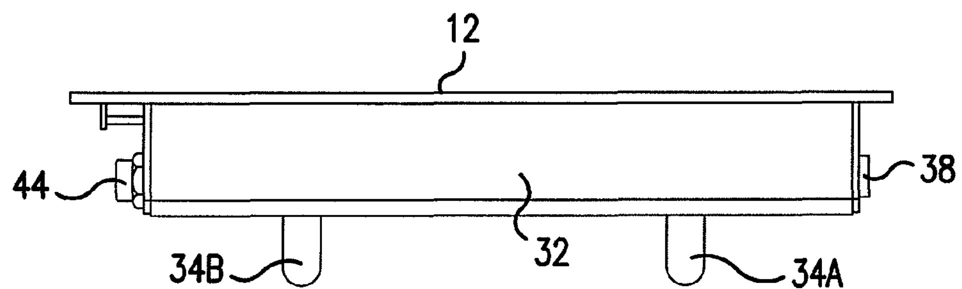
FIG. 3 is a front elevational view of the griddle illustrated in FIG. 1.

As illustrated in FIGS. 1-3 a griddle 10 is provided for cooking a food product. A cooking surface includes an upper surface 12, a lower surface 14, a first side 16, a second side 18, a front side 20 and a rear side 22. A serpentine passageway 24 is secured on said lower surface 14 of the griddle 10. A collector tank 30 is secured directly to the lower surface 14 adjacent to the first side 16 of the griddle 10. The collector tank 30 is in communication with the serpentine passageway 24 formed on the lower surface 14. A boiler 32 is secured directly to the lower surface 14 adjacent to the second side 18 of the griddle 10. The boiler is in communication with the serpentine passageway 24 formed on the lower surface 14. Heat may be applied directly to either the collector tank 30 or the boiler 32 for boiling water disposed therein and supplying steam to the serpentine passageway 24 providing heat for cooking a food product disposed on the cooking surface.

In the present embodiment, heat is supplied to the boiler 32 for providing steam that is supplied to the serpentine passageway 24.

The serpentine passageway 24 may be formed of a sheet of metallic material that is welded to the lower surface 14 of the cooking surface. In addition, the collector tank 30 may be welded to the lower surface 14 and extends from approximately the front side 20 of the cooking surface to approximately the rear side 22 thereof. The collector tank 30 is of a predetermined depth for containing a predetermined amount of water.

The boiler 32 may be welded to the lower surface 14 and extends from approximately the front side 20 of the cooking surface to approximately the rear side 22 thereof. The boiler 32 is of a predetermined depth for containing a predetermined amount of water that is heated to form steam that is supplied to the serpentine passageway 24.

At least one return tubing 34A, 34B extends from the collector tank 30 to the boiler 32 for supplying water and steam therebetween.

A boiler support plate 36 extends from the collector tank 30 to the boiler 32 for mounting the collector tank 30 and boiler 32 relative to each other.

As illustrated in FIG. 1, the boiler 32 includes an opening 38 for positioning an electric heating element directly into the boiler 32 in a fluid tight manner for heating water disposed therein. In addition, the boiler 32 includes a water supply fitting 42 for supplying water to the boiler 32 and a water discharge fitting 44 for permitting an overflow of water to flow therefrom.

As illustrated in FIGS. 4-7 a griddle 110 is provided for cooking a food product. A cooking surface includes an upper surface 112, a lower surface 114, a first side 116, a second side 118, a front side 120 and a rear side 122. A serpentine passageway 124 is secured on said lower surface 114 of the griddle 110. A collector tank 130 is secured directly to the lower surface 114 adjacent to the first side 116 of the griddle 110. The collector tank 130 is in communication with the serpentine passageway 124 formed on the lower surface 114. A boiler 132 is secured directly to the lower surface 114 adjacent to the second side 118 of the griddle 110. The boiler 132 is in communication with the serpentine passageway 124 formed on the lower surface 114. Heat may be applied directly to the boiler 132 for heating water disposed therein and supplying steam to the serpentine passageway 124 for providing heat for cooking a food product disposed on the cooking surface.

In the present embodiment, heat is supplied to the boiler 132 for providing steam that is supplied to the serpentine passageway 124.

The serpentine passageway 124 may be formed of a sheet of metallic material that is welded to the lower surface 114 of the cooking surface. In addition, the collector tank 130 may be welded to the lower surface 114 and extends from approximately the front side 120 of the cooking surface to approximately the rear side 122 thereof. The collector tank 130 is of a predetermined depth for containing a predetermined amount of water.

The boiler 132 may be welded to the lower surface 114 and extends from approximately the front side 120 of the cooking surface to approximately the rear side 122 thereof. The boiler 132 is of a predetermined depth for containing a predetermined amount of water that is heated to form steam that is supplied to the serpentine passageway 124.

At least one condensate return tubing 134A, 13413 extends from the collector tank 130 to the boiler 132 for supplying water therebetween.

A support plate 136 extends from the collector tank 130 to the boiler 132 for mounting the collector tank and boiler relative to each other.

Figure 4:
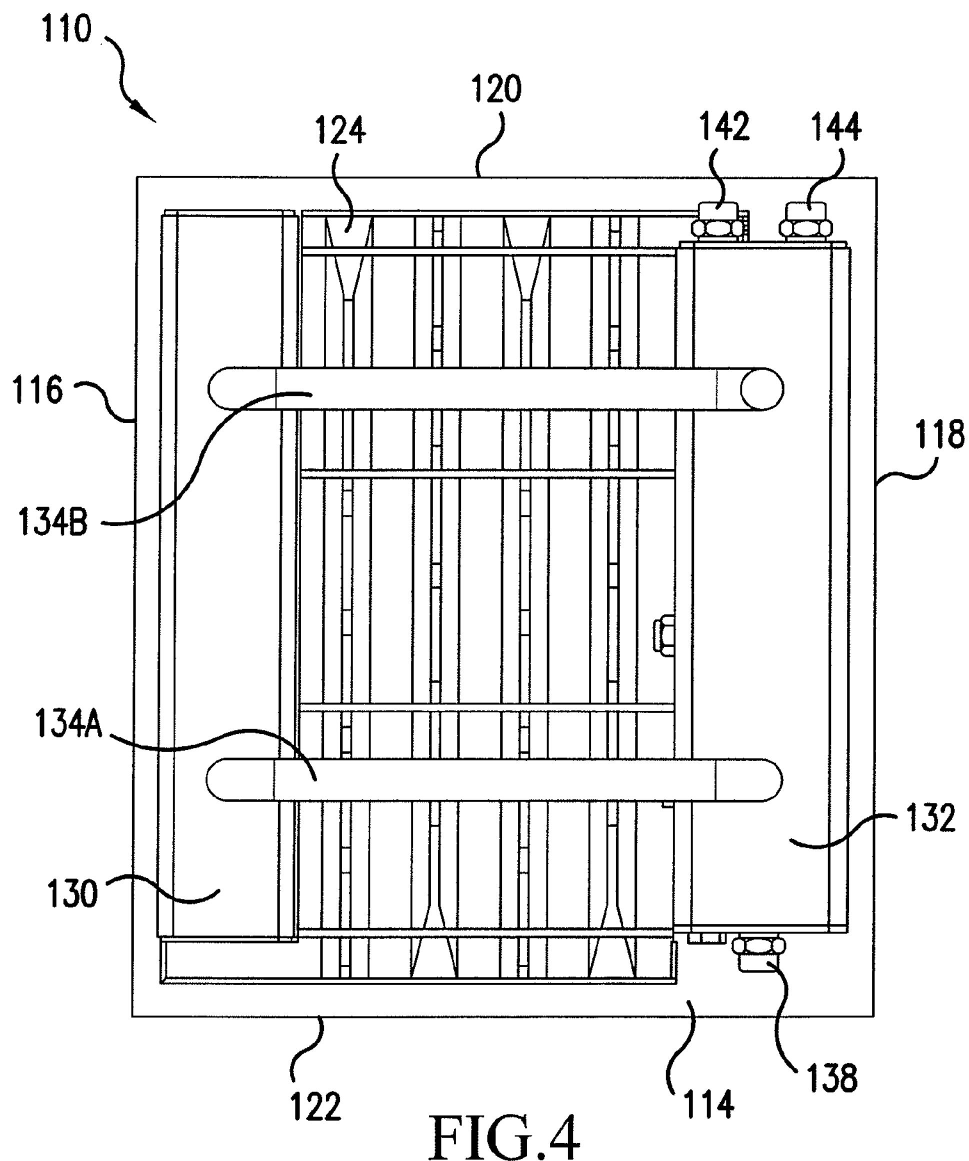
FIG. 4 is a bottom view of a griddle according to a second embodiment of the present invention.
Figure 5:
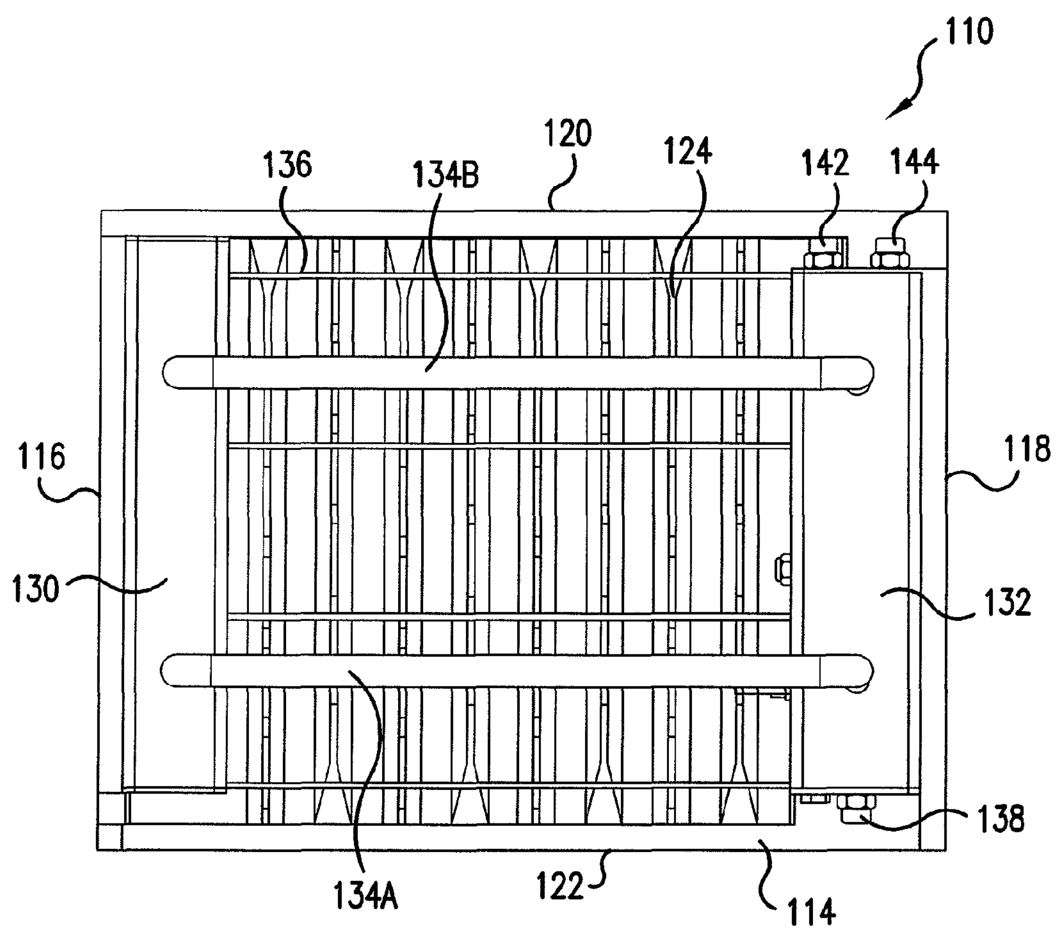
FIG. 5 is a bottom view of an elongated version of the griddle according to the second embodiment.
Figure 6:
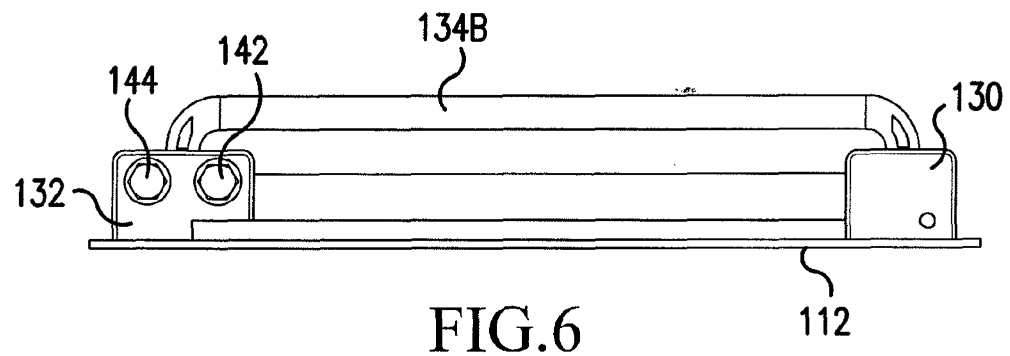
FIG. 6 is a front elevational view of the griddle illustrated in FIG. 5.
Figure 7:
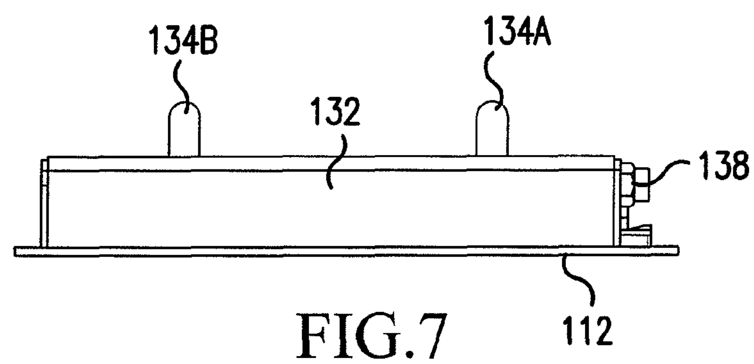
FIG. 7 is a left side elevational view of the griddle illustrated in FIG. 5.

As illustrated in FIGS. 4 and 5, the boiler 132 includes an opening 138 for positioning an electric heating element directly into the boiler 132 in a fluid tight manner for boiling water disposed therein. In addition, the boiler 132 includes a water supply fitting 142 for supplying water to the boiler 132 and a water discharge fitting 144 for permitting an overflow of water to flow therefrom.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A counter-top griddle adapted for cooking a food product comprising:

a cooking surface having an upper surface, a lower surface, a first side, a second side, a front side and a rear side;

a serpentine passageway formed on said lower surface, said serpentine passageway including numerous turns and extending from approximately said first side of said cooking surface to approximately said second side of the cooking surface and extending from approximately the front side of the cooking surface to approximately the rear side of the cooking surface;

a separate collector tank juxtaposed and secured directly in touching contact with said lower surface adjacent to the first side of said griddle, said separate collector tank being in direct communication with said serpentine passageway formed on the lower surface of the cooking surface, said separate collector tank including a wall forming an enclosure for the separate collector tank;

a separate boiler juxtaposed and secured directly in touching contact with said lower surface adjacent to the second side of said griddle, said separate boiler being in direct communication with said serpentine passageway formed on the lower surface, the separate boiler being disposed a predetermined distance from the separate collector tank with the serpentine passageway forming the direct communication passageway therebetween, said separate boiler including a wall forming an enclosure for the separate boiler;

heat applied directly to the separate boiler for generating steam disposed therein supplies said steam directly to said serpentine passageway and through said serpentine passageway directly to the separate collector tank to evenly heat the cooking surface for cooking a food product disposed on the cooking surface;

wherein the direct communication between the separate boiler and the serpentine passageway and the direct communication between the separate collector tank and the serpentine passageway substantially eliminates air from entering the serpentine passageway to enable the even heating of the cooking surface for cooking the food product disposed on the cooking surface; and at least one condensate return tubing extending from the separate collector tank to the separate boiler for directly supplying water therebetween, said at least one condensate return tubing being connected directly to the wall of the separate collector tank and directly to the wall of the separate boiler and being displaced below the cooking surface.

2. The counter-top griddle adapted for cooking a food product according to claim 1, wherein the serpentine passageway is formed of a sheet of metallic material that is welded to the lower surface of said cooking surface.

3. The counter-top griddle adapted for cooking a food product according to claim 1, wherein the separate collector tank is welded to the lower surface and extends from approximately the front side of the cooking surface to approximately the rear side thereof, said separate collector tank being of a predetermined depth for containing a predetermined amount of water.

4. The counter-top griddle adapted for cooking a food product according to claim 1, wherein the separate boiler is welded to the lower surface and extends from approximately the front side of the cooking surface to approximately the rear side thereof, said separate boiler being of a predetermined depth for containing a predetermined amount of water that is heated to form steam that is directly supplied to the serpentine passageway.

5. The counter-top griddle adapted for cooking a food product according to claim 1, wherein said separate boiler includes an opening for positioning an electric heating element directly into the separate boiler in a fluid tight manner for heating water disposed therein.

6. The counter-top griddle adapted for cooking a food product according to claim 1, wherein said separate boiler includes a water inlet fitting for supplying water thereto.

7. The counter-top griddle adapted for cooking a food product according to claim 1, wherein said separate boiler includes a water outlet fitting for discharging water therefrom.

8. A counter-top griddle adapted for cooking a food product comprising:

a cooking surface having an upper surface and a lower surface;

a serpentine passageway directly positioned on said lower surface, said serpentine passageway having an inlet opening and an outlet opening and said serpentine passageway including numerous turns and extending from approximately said first side of said cooking surface to approximately said second side of the cooking surface and extending from approximately the front side of the cooking surface to approximately the rear side of the cooking surface;

a separate boiler juxtaposed and secured directly in touching contact with said lower surface of said griddle, said separate boiler being in direct communication with said inlet opening in said serpentine passageway formed on the lower surface, said separate boiler including a wall forming an enclosure for the separate boiler;

a separate collector tank juxtaposed and secured directly in touching contact with said lower surface of said griddle and spaced a predetermined distance from said separate boiler, said separate collector tank being in direct communication with said outlet opening in said serpentine passageway formed on the lower surface, the separate collector tank is disposed a predetermined distance from the separate boiler with the serpentine passageway forming a communication passageway therebetween, said separate collector tank including a wall forming an enclosure for the separate collector tank;

heat applied directly to the separate boiler for generating steam disposed therein and supplying said steam directly to said inlet opening in said serpentine passageway and through said serpentine passageway directly to the separate collector tank to evenly heat the cooking surface for cooking a food product disposed on the cooking surface and wherein said steam is condensed into water during the cooking process and then is discharged directly from said outlet opening in said serpentine passageway to said separate collector tank;

wherein the direct communication between the separate boiler and the serpentine passageway and the direct communication between the separate collector tank and the serpentine passageway substantially eliminates air from entering the serpentine passageway to enable the even heating of the cooking surface for cooking the food product disposed on the cooking surface; and at least one condensate return tubing extending from the separate collector tank to the separate boiler for directly supplying water therebetween, said at least one condensate return tubing being directly connected to the wall of the separate collector tank and directly to the wall of the separate boiler and being displaced below the cooking surface.

9. The counter-top griddle adapted for cooking a food product according to claim 8, wherein the serpentine passageway is formed of a sheet of metallic material that is welded to the lower surface of said cooking surface.

10. The counter-top griddle adapted for cooking a food product according to claim 8, wherein the separate collector tank is welded to the lower surface and extends from approximately a front side of the cooking surface to approximately a rear side thereof, said separate collector tank being of a predetermined depth for containing a predetermined amount of water.

11. The counter-top griddle adapted for cooking a food product according to claim 8, wherein the separate boiler is welded to the lower surface and extends from approximately a front side of the cooking surface to approximately a rear side thereof, said separate boiler being of a predetermined depth for containing a predetermined amount of water that is heated to form steam that is directly supplied to the serpentine passageway.

12. The counter-top griddle adapted for cooking a food product according to claim 8, wherein said separate boiler includes an opening for positioning an electric heating element directly into the boiler in a fluid tight manner for heating water disposed therein.

13. The counter-top griddle adapted for cooking a food product according to claim 8, wherein said separate boiler includes a water inlet fitting for supplying water thereto.

14. The counter-top griddle adapted for cooking a food product according to claim 8, wherein said separate boiler includes a water outlet fitting for discharging water therefrom.

15. A counter-top griddle adapted for cooking a food product comprising:

a cooking surface having an upper surface, a lower surface, a first side, a second side, a front side and a rear side;

a serpentine passageway formed on said lower surface, said serpentine passageway including numerous turns and extending from approximately said first side of said cooking surface to approximately said second side of the cooking surface and extending from approximately the front side of the cooking surface to approximately the rear side of the cooking surface;

a separate collector tank juxtaposed and directly welded in touching contact with said lower surface adjacent to the first side of said griddle, said separate collector tank being in direct communication with said serpentine passageway formed on the lower surface and extends from approximately the front surface of the cooking surface to approximately the rear side thereof, wherein a collector tank cooking area is formed on said cooking surface above said separate collector tank, said separate collector tank including a wall forming an enclosure for the separate collector tank; and a separate boiler juxtaposed and directly welded in touching contact with said lower surface adjacent to the second side of said griddle, said separate boiler being in direct communication with said serpentine passageway formed on the lower surface and extends from approximately the front side of the cooking surface to approximately the rear side thereof, wherein a boiler cooking area is formed on the cooking surface above said separate boiler, said separate boiler being disposed a predetermined distance from the separate collector tank with the serpentine passageway forming a direct communication passageway therebetween, said separate boiler including a wall forming an enclosure for the separate boiler;

heat applied directly to the separate boiler for generating steam disposed therein supplies said steam directly to said serpentine passageway and through said serpentine passageway directly to the separate collector tank to evenly heat a cooking surface for cooking a food product disposed on the cooking surface above the separate boiler, the serpentine passageway or the separate collector tank;

wherein the direct communication between the separate boiler and the serpentine passageway and the direct communication between the separate collector tank and the serpentine passageway substantially eliminates air from entering the serpentine passageway to enable the even heating of the cooking surface for cooking the food product disposed on the cooking surface; and at least one condensate return tubing extending from the separate collector tank to the separate boiler for directly supplying water therebetween, said at least one condensate return tubing being directly connected to the wall of the separate collector tank and directly to the wall of the separate boiler and being displaced below the cooking surface.

16. The counter-top griddle adapted for cooking a food product according to claim 15, wherein the serpentine passageway is formed of a sheet of metallic material that is welded to the lower surface of said cooking surface.

17. The counter-top griddle adapted for cooking a food product according to claim 15, wherein said separate boiler includes an opening for positioning an electric heating element directly into the separate boiler in a fluid tight manner for heating water disposed therein and further including a water inlet fitting for supplying water thereto and a water outlet fitting for discharging water therefrom.

* * * * *